(12) United States Patent
Iino (10) Patent No.: US 11,938,500 B2
(45) Date of Patent: Mar. 26, 2024

(54) SUBSTRATE PROCESSING APPARATUS AND METHOD FOR DETERMINING DETERIORATION DEGREE OF CONDUCTIVE PIPE

(71) Applicant: Tokyo Electron Limited, Tokyo (JP)

(72) Inventor: Tadashi Iino, Kumamoto (JP)

(73) Assignee: TOKYO ELECTRON LIMITED, Tokyo (JP)

(*) Notice: Subject to any disclaimer, the term of this patent is extended or adjusted under 35 U.S.C. 154(b) by 559 days.

(21) Appl. No.: 17/183,816

(22) Filed: Feb. 24, 2021

(65) Prior Publication Data
US 2021/0276031 A1 Sep. 9, 2021

(30) Foreign Application Priority Data

Mar. 9, 2020 (JP) ................. 2020-040244

(51) Int. Cl.
*B05B 15/18* (2018.01)
*G01N 27/07* (2006.01)

(52) U.S. Cl.
CPC .............. *B05B 15/18* (2018.02); *G01N 27/07* (2013.01)

(58) Field of Classification Search
CPC .................................................... B05B 15/18
See application file for complete search history.

(56) References Cited

U.S. PATENT DOCUMENTS

2005/0236018 A1* 10/2005 Nagami ............ H01L 21/67051
134/30

FOREIGN PATENT DOCUMENTS

JP          2003-278972 A       10/2003

* cited by examiner

*Primary Examiner* — Walter H Swanson
(74) *Attorney, Agent, or Firm* — Venjuris, P.C.

(57) ABSTRACT

A substrate processing apparatus includes: a substrate holder; a nozzle that ejects a processing liquid to the substrate; a conductive pipe that supplies the processing liquid to the nozzle; a ground line that connects the conductive pipe to a reference potential; a liquid receiver provided around the substrate holder and receives liquid ejected from the nozzle; and a deterioration degree measuring unit that measures a deterioration degree of conductivity of the conductive pipe. The deterioration degree measuring unit includes: a measurement liquid supply that supplies a measurement liquid to the conductive pipe; a potential difference imparting unit that imparts a potential difference between a liquid contact surface of the liquid receiver and the reference potential; and an ammeter that measures a current value of a current flowing through a charge moving path established via the measurement liquid between the liquid contact surface of the liquid receiver and the ground line.

11 Claims, 8 Drawing Sheets

SUBSTRATE PROCESSING APPARATUS AND METHOD FOR DETERMINING DETERIORATION DEGREE OF CONDUCTIVE PIPE

CROSS-REFERENCE TO RELATED APPLICATIONS

This application is based on and claims priority from Japanese Patent Application No. 2020-040244 filed on Mar. 9, 2020 with the Japan Patent Office, the disclosure of which is incorporated herein in its entirety by reference.

TECHNICAL FIELD

The present disclosure relates to a substrate processing apparatus and a method for determining a deterioration degree of a conductive pipe.

BACKGROUND

The manufacturing process of a semiconductor apparatus includes a liquid treatment process in which a liquid processing is performed on a substrate by supplying a processing liquid to the substrate from a nozzle. From the viewpoint of preventing damage caused by the processing liquid, and preventing charging caused by friction with the processing liquid flowing inside a pipe, a conductive pipe in which a conductive member such as striped carbon is incorporated into a fluororesin such as PFA is often used as a pipe that supplies the processing liquid to the nozzle (see, e.g., Japanese Patent Application Laid-Open No. 2003-278972).

SUMMARY

An embodiment of a substrate processing apparatus includes: a substrate holder that holds and processes a substrate; a nozzle that ejects a processing liquid to the substrate held by the substrate holder; a conductive pipe that is connected to the nozzle and supplies the processing liquid to the nozzle; a ground line that connects the conductive pipe and a reference potential; a liquid receiver that is provided around the substrate holder and receives liquid ejected from the nozzle; and a deterioration degree measuring unit that measures a deterioration degree of conductivity of the conductive pipe. The deterioration degree measuring unit includes: a measurement liquid supply that supplies a measurement liquid to the conductive pipe and ejects the measurement liquid from the nozzle; a potential difference imparting unit that imparts a potential difference between a liquid contact surface of the liquid receiver and the reference potential; and an ammeter that, when the measurement liquid is ejected from the nozzle to the liquid receiver, measures a current value of a current flowing through a charge moving path established via the measurement liquid between the liquid contact surface of the liquid receiver and the ground line.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

An embodiment of a substrate processing apparatus will be described with reference to the accompanying drawings.

Figure 1:
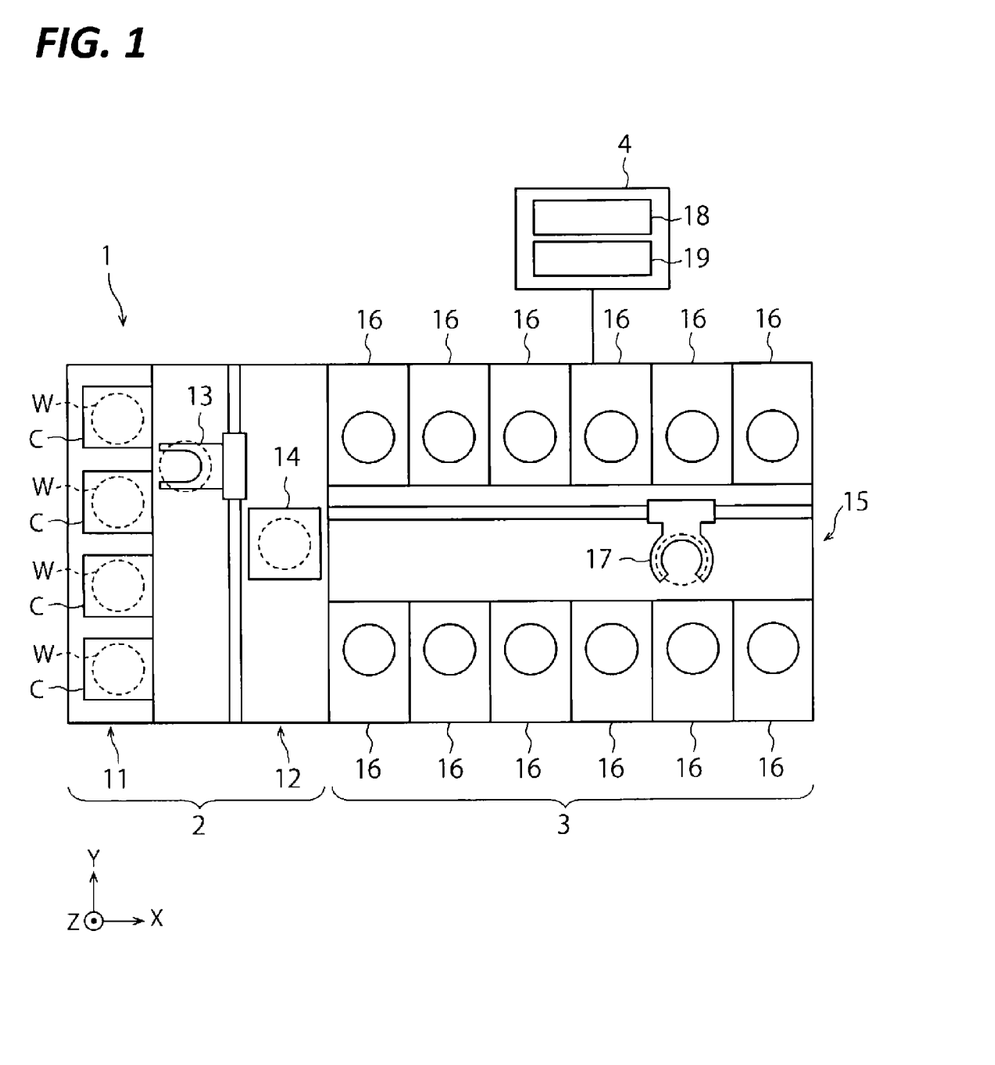
FIG. 1 is a cross-sectional view of a substrate processing apparatus according to an embodiment.

FIG. 1 is a view illustrating a schematic configuration of a substrate processing system according to an embodiment of the present disclosure. In the following, in order to clarify positional relationships, the X-axis, the Y-axis, and the Z-axis which are orthogonal to each other will be defined. The positive Z-axis direction will be regarded as a vertically upward direction.

As illustrated in FIG. 1, a substrate processing system 1 includes a carry-in/out station 2 and a processing station 3. The carry-in/out station 2 and the processing station 3 are provided adjacent to each other.

The carry-in/out station 2 is provided with a carrier placing section 11 and a transfer section 12. In the carrier placing section 11, a plurality of carriers C are placed to horizontally accommodate a plurality of substrates, that is, semiconductor wafers (hereinafter, "wafers W") in the present embodiment.

The transfer section 12 is provided adjacent to the carrier placing section 11, and provided with a substrate transfer device 13 and a delivery unit 14 therein. The substrate transfer device 13 is provided with a wafer holding mechanism configured to hold the wafer W. Further, the substrate transfer device 13 is movable horizontally and vertically and pivotable around a vertical axis. The transfer device 13 transfers the wafers W between the carriers C and the delivery unit 14 by using the wafer holding mechanism.

The processing station 3 is provided adjacent to the transfer section 12. The processing station 3 is provided with a transfer section 15 and a plurality of processing units 16. The plurality of processing units 16 are arranged at both sides of the transfer section 15.

The transfer section 15 is provided with a substrate transfer device 17 therein. The substrate transfer device 17 is provided with a wafer holding mechanism configured to hold the wafer W. Further, the substrate transfer device 17 is movable horizontally and vertically and pivotable around a vertical axis. The substrate transfer device 17 transfers the wafers W between the delivery unit 14 and the processing units 16 by using the wafer holding mechanism.

The processing units 16 perform a predetermined substrate processing on the wafers W transferred by the substrate transfer device 17.

Further, the substrate processing system 1 is provided with a control device 4. The control device 4 is, for example, a computer, and includes a controller 18 and a storage unit 19. The storage unit 19 stores a program that controls various processings performed in the liquid processing system 1. The controller 18 controls the operations of the liquid processing system 1 by reading and executing the program stored in the storage unit 19.

Further, the program may be recorded in a computer-readable recording medium, and installed from the recording medium to the storage unit 19 of the control device 4. The computer-readable recording medium may be, for example, a hard disk (HD), a flexible disk (FD), a compact disk (CD), a magnet optical disk (MO), or a memory card.

In the substrate processing system 1 configured as described above, the substrate transfer device 13 of the carry-in/out station 2 first takes out a wafer W from a carrier C placed in the carrier placing section 11, and then, places the taken wafer W on the delivery unit 14. The wafer W placed on the transfer unit 14 is taken out from the transfer unit 14 by the substrate transfer device 17 of the processing station 3, and carried into a processing unit 16.

The wafer W carried into the processing unit 16 is processed by the processing unit 16, and then, carried out from the processing unit 16 and placed on the delivery unit 14 by the substrate transfer device 17. The processed wafer W placed on the delivery unit 14 returns to the carrier C of the carrier placing section 11 by the substrate transfer device 13.

Figure 2:
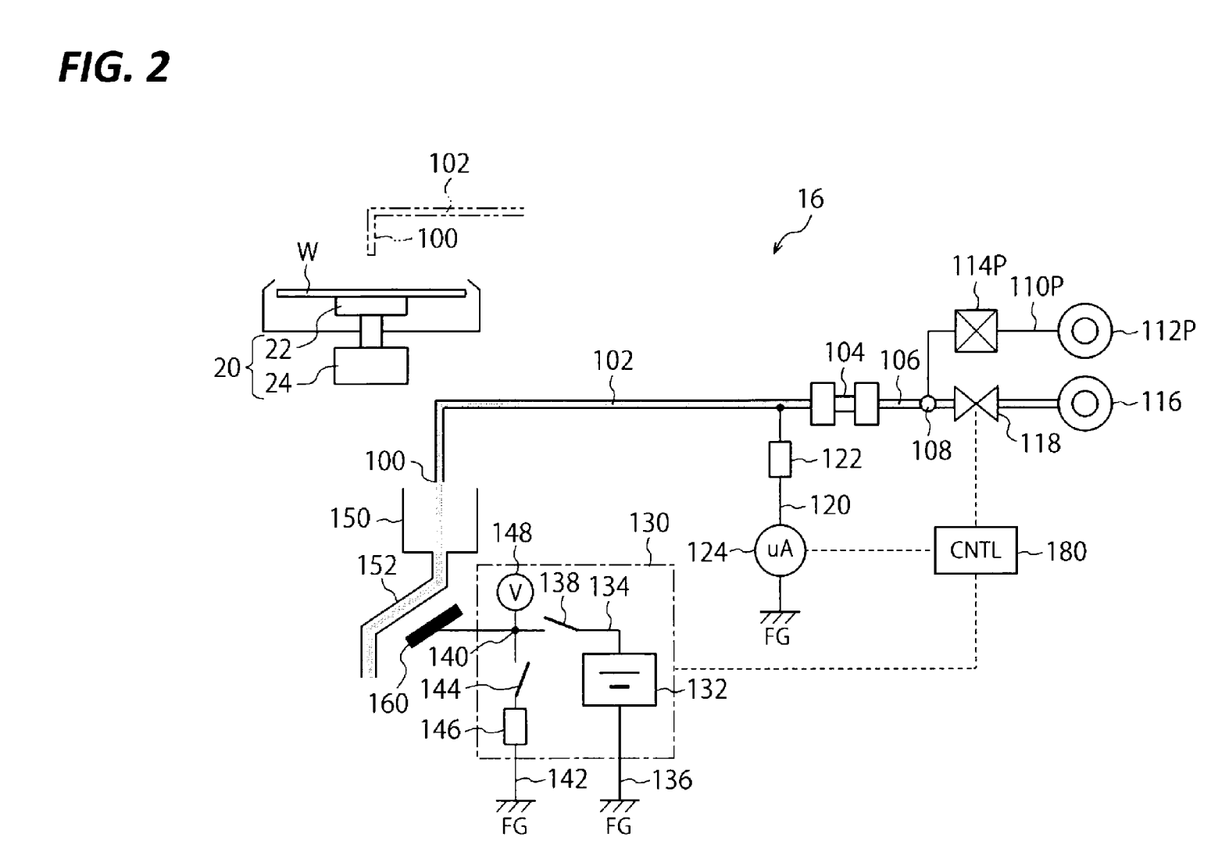
FIG. 2 is a schematic view illustrating a configuration of a first embodiment of a deterioration degree measuring unit included in a processing unit.

Next, descriptions will be made on a configuration of the processing unit 16 with reference to FIG. 2.

The processing unit 16 includes a spin chuck 20 serving as a substrate holder. The spin shuck 20 includes a substrate holding body 22 that horizontally holds a substrate W, for example, a semiconductor wafer, and a rotation driving unit 24 that rotates the substrate holding body 22 around a vertical axis. The substrate holding body 22 may be any one of a vacuum chuck or a mechanical chuck. A processing liquid is supplied from at least one nozzle 100 to the substrate W. The periphery of the substrate holding body 22 is surrounded by a liquid receiving cup 26. The liquid receiving cup 26 collects the processing liquid separated from the substrate W after being supplied to the substrate W from the nozzle 100.

The nozzle 100 may move between a processing position above the substrate W held by the spin chuck 20 and a retracted position immediately above a dummy dispense port 150 provided outside the liquid receiving cup 26, by a nozzle moving mechanism (not illustrated). The nozzle moving mechanism (not illustrated) is provided with, for example, a pivot type arm that holds the nozzle 100 (and a conductive pipe 102 (to be described later)). The nozzle 100 in the processing position is schematically illustrated on the left upper side of FIG. 2, and the nozzle 100 in the retracted position is schematically illustrated in the center portion of FIG. 2.

The nozzle 100 may be configured by a tip end portion of the conductive pipe 102. In this case, a tip end opening of the conductive pipe 102 becomes an ejection port of the nozzle 100.

Instead of the above, the nozzle 100 may be a member separate from the conductive pipe 102 attached to the tip end of the conductive pipe 102. In this case, the nozzle 100 may be made of a fluororesin (e.g., PFA or PTFA) having high chemical resistance.

Figure 3:
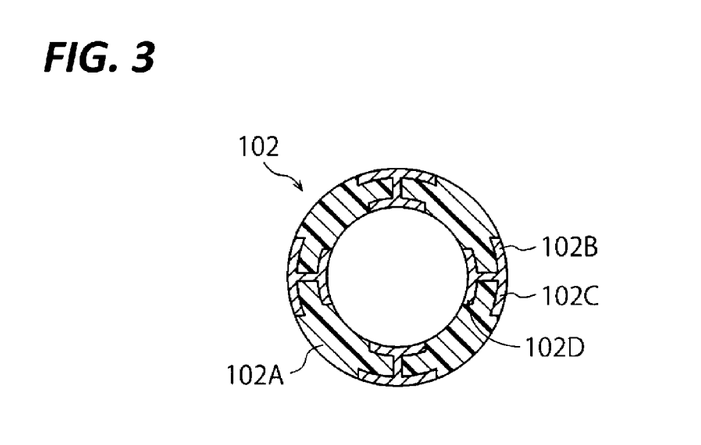
FIG. 3 is a cross-sectional view illustrating an example of an inner structure of a conductive pipe.

An example of the configuration of the conductive pipe 102 is illustrated in FIG. 3. In the example in FIG. 3, the conductive pipe 102 is configured by a non-conductive pipe body 102A containing a fluororesin, and four conductive H-type cross-section strips 102B provided in the pipe body 102A. A strip 102B may be made of, for example, a fluororesin such as PFA in which conductive particles such as carbon black are mixed. The conductive pipe 102 may have another configuration. For example, the entire conductive pipe 102 may be made of a fluororesin in which conductive particles are mixed.

In the following, a case in which the nozzle 100 is configured by the tip end portion of the conductive pipe 102 will be described.

An upstream end of the conductive pipe 102 is connected to a non-conductive pipe 106 containing an insulating material (e.g., fluororesin) via a pipe joint 104 containing an insulating material (e.g., fluororesin). At least one non-conductive processing liquid supply pipe 110P is branched from a branch point 108 on the non-conductive pipe 106. An upstream end of the processing liquid supply pipe 110P is connected to a processing liquid supply source 112P. The processing supply pipe 112P is provided with a flow control mechanism 114P including, for example, an opening/closing valve, a flow meter, a flow control valve. When a liquid treatment is performed on the substrate W, the processing liquid (e.g., chemical liquid such as SPM) is supplied to the nozzle 100 through the processing liquid supply pipe 110P from the processing liquid supply source 112P.

An upstream end of the non-conductive pipe 106 is connected to a measurement liquid supply source 116. An opening/closing valve 118 such as an air operation valve is provided between the branch point 108 and the measurement liquid supply source 116. Electrical resistivity of the measurement liquid may be as high as possible, and an example of a suitable measurement liquid is deionized water (DIW) (also referred to as pure water). The members 116 and 118 configure a measurement liquid supply.

When the processing liquid ejected from the nozzle 100 has sufficiently high electrical resistivity, the processing liquid may also be used as the measurement liquid. In this case, the processing liquid supplies 110P, 112P, and 114P may be used as the measurement liquid supply.

At a position away from the nozzle 100 to the upstream side (e.g., in the vicinity of the pipe joint 104), one end of a ground line 120 is electrically connected to the conductive pipe 102. The other end of the ground line 120 is electrically connected to a reference potential point (reference potential) (FG). When the conductive pipe 102 has the configuration illustrated in FIG. 3, an outer portion 102C of the H-type cross-section strip 102B exposed on the outer peripheral surface of the conductive pipe 102 is connected to the ground line 120. The reference potential point is, for example, a metal frame (machine casing) (not illustrated) of the substrate processing system 1, and is also called a frame ground FG. The metal frame is desirably connected to ground earth. The ground line 120 is used to install devices related to a deterioration degree measuring unit (to be described later).

When the liquid processing is performed on the substrate W in the processing unit 16, static electricity may be generated due to friction between the inner surface of the pipe body 102A of the conductive pipe 102 and the processing liquid passing through the conductive pipe 102. The static electricity (charge) is moved from an inner portion 102D of the strip 102B in contact with the processing liquid to the outer portion 102C, and is released to the frame ground through the ground line 120, whereby the treatment liquid is discharged. Therefore, it is possible to prevent electrostatic destruction of a device formed on the substrate W, or ignition of the flammable treatment liquid.

The conductive particles in the vicinity of the surface (surface in contact with the processing liquid) of the inner portion 102D of the strip 102B gradually fall off by the treatment liquid flowing inside the conductive pipe 102. In the portion of the inner portion 102D where the conductive particles in the vicinity of the surface are fallen off, a resin material having a large number of holes is remained. The conductivity of this portion is very low. As a volume of the portion from which the conductive particles are fallen off increases, the resistance between the surface of the inner portion 102D of the strip 102B and the outer portion 102C increases, and the discharge performance is deteriorated. In the processing unit 16 according to the embodiment, a deterioration degree measuring unit configured to detect a deterioration degree of the conductivity of the conductive pipe 102, particularly, the strip 102B is provided.

In the following, a first embodiment of the deterioration degree measuring unit will be described.

A drainage pipe 152 is connected to the dummy dispense port 150. The dummy dispense port 150 and the drainage pipe 152 are collectively referred to as a "liquid receiver." The dummy dispense port 150 and the drainage pipe 152 are made of a dielectric material. The dielectric material may be a fluororesin such as, for example, PFA or PTFE. The configuration and the material of the dummy dispense port 150 and the drainage pipe 152 may be the same as those used in a general substrate processing unit.

An electrode 160 containing a conductive material is provided near the outer surface of the portion of the drainage pipe 152 in the vicinity of the dummy dispense port 150. A voltage is applied to the electrode 160 by a voltage application unit 130 (portion surrounded by the alternate long and short dash line in FIG. 2).

A configuration of the voltage application unit 130 will be described below. The voltage application unit 130 is provided with a high voltage DC power source 132. The high voltage DC power source 132 is configured to impart a controlled desired potential (e.g., several kV) with respect to the frame ground FG to the electrode 160. A positive electrode of the high voltage DC power source 132 is electrically connected to the electrode 160 via a first conductive line 134 and a negative electrode thereof is electrically connected to the frame ground (reference potential point) via a ground line 136. The connected destinations of the positive electrode and the negative electrode of the high voltage DC power source 132 may be reversed.

A first switch 138 is provided on the first conductive line 134. A branch point 140 set on the first conductive line 134 is electrically connected to the frame ground (reference potential point) via a ground line (second conductive line) 142.

A second switch 144 and a resistor 146 (desirably a variable resistor) is provided on the ground line 142. In order to measure the potential of the electrode 160, an electrometer 148 is either directly connected to the electrode 160 or connected at an arbitrary position in the section between the electrode 160 of the first conductive line 134 and the first switch 138. The electrometer 148 is illustrated as a contact type electrometer in FIG. 2, but a non-contact type surface electrometer may be used as the electrometer 148. The electrometer 148 may also be used to confirm the presence or absence of electric leakage in the voltage application unit 130.

The first switch 138 and the second switch 144 may be normally closed contacts (also referred to as "B contacts"). Therefore, the electrode 160 may be reliably discharged when a problem occurs in the power source system of the substrate processing system 1, which is desirable from the viewpoint of safety of a maintenance operator. Further, since a high voltage of several kV is applied to the first switch 138 and the second switch 144, it is desirable to use a switch that may stand the high voltage such as a reed switch (reed relay).

The deterioration degree measuring unit is further provided with a resistor 122, desirable a variable resistor and an ammeter 124. The resistor 122 and the ammeter 124 are provided on the ground line 120 described above. The ammeter 124 capable of detecting a minute current on the order of microampere may be used. The resistor 122, for example, having a resistance value of about 100 MΩ may be used.

The deterioration degree measuring unit is further provided with a controller 180. The controller 180 may control at least the operation of the voltage application unit 130 and the operation of the opening/closing valve 118. The controller 180 receives a detection signal of the electrometer 148 and the ammeter 124. The controller 180 has a function as a calculation unit for obtaining the resistance value of the conductive pipe 102 based on the detection result of the ammeter 124. The function of the calculation unit may include a function of determining soundness (conductivity) of the strip 102B of the conductive pipe 102 based on the resistance value.

Figure 4:
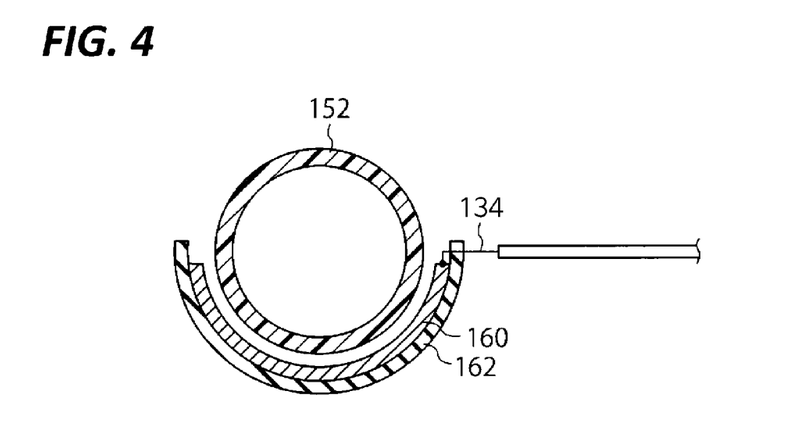
FIG. 4 is a cross-sectional view illustrating a configuration near an electrode.

FIG. 4 illustrates an example of a configuration around the electrode 160. The arc-shaped electrode 160 is provided near the outer surface of the portion of the drainage pipe 152 in the vicinity of the dummy dispense port 150. A shield electric wire serving as the first conductive line 134 is connected to the electrode 160. The drainage pipe 152 may be as thin as possible as long as dielectric breakdown does not occur, and as a result, the measurement accuracy of the resistance may be improved. The electrode 160 may be made of a conductive material such as metal or conductive rubber. From the viewpoint of preventing electric leakage, an insulating material 162 is provided outside the electrode 160.

Next, the operation of the deterioration degree measuring unit will be described with reference to FIG. 5 and FIGS. 6A, 6B, 6C, 6D, 6E, and 6F. The resistance measurement operation by the deterioration degree measuring unit is executed under the control of the controller 180. The controller 180 may be a part of the control device 4 illustrated in FIG. 1. A recipe defining a procedure of the resistance measurement operation is stored in a memory unit of the controller 180, and the controller 180 executes the resistance measurement operation (to be described below) in the processing unit 16 (or substrate processing system 1) according to the recipe.

Figure 5:
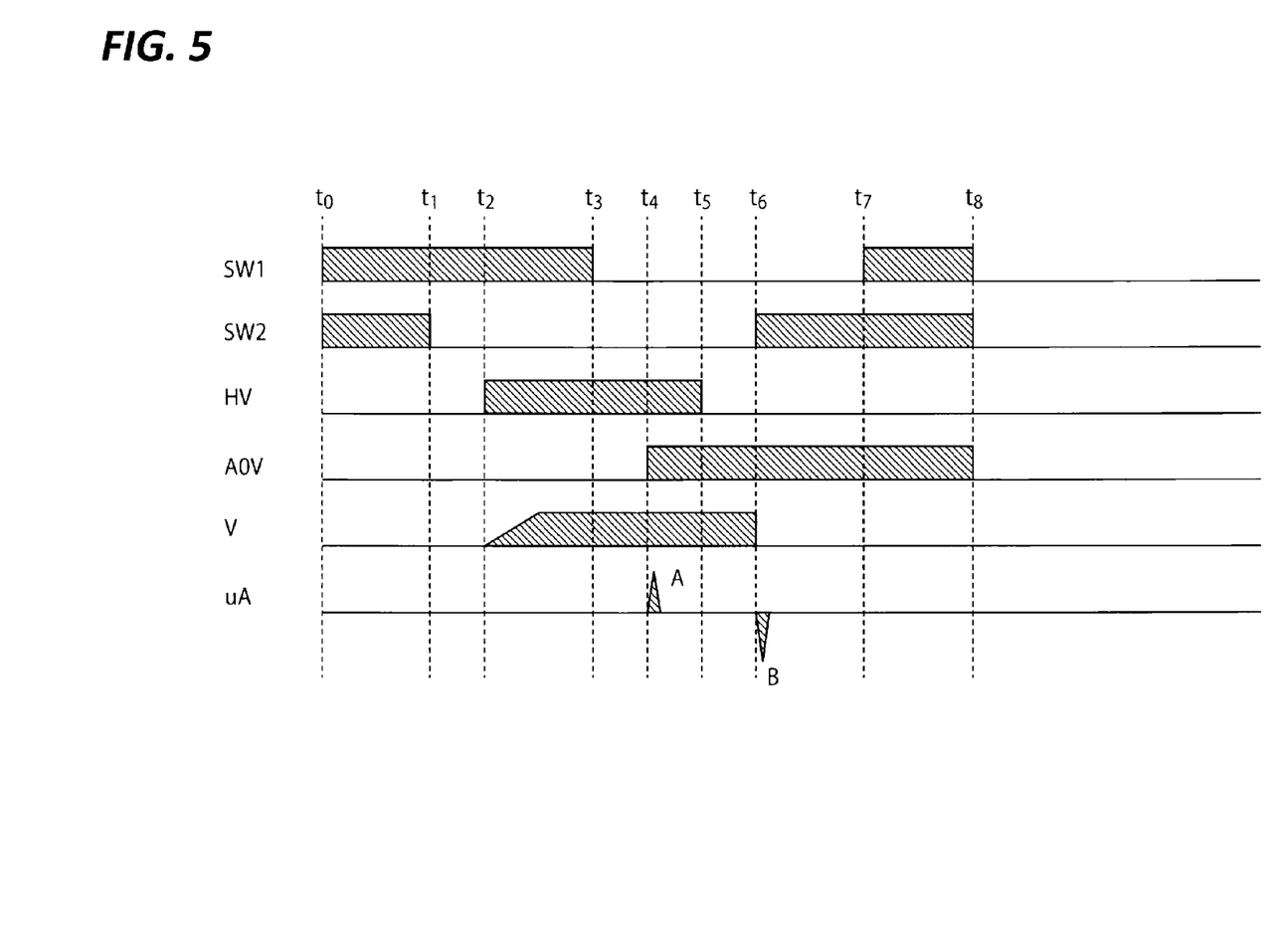
FIG. 5 is a time chart illustrating a procedure for measuring a deterioration degree.

FIG. 5 is a time chart for describing the operation of the deterioration degree measuring unit. The horizontal axis illustrates passage of time. "SW1" indicates the state of the first switch 138 and "SW2" indicates the state of the second switch 144, and the filled portion indicates that the switch is in the closed state. "HV" indicates the state of the high voltage DC power source 132, and the filled portion indicates that the high voltage DC power source 132 outputs a voltage. "AOV" indicates the state of the opening/closing valve 118, and the filled portion indicates that the opening/closing valve 118 is opened and the measurement liquid is ejected from the nozzle 100. "V" indicates the potential of the electrode 160. "μA" indicates the current detected by the ammeter 124. Definitions of "SW1," "SW2," "HV," "AOV," "V," and "μA" are the same in FIGS. 6A to 6F.

Figure 6A:
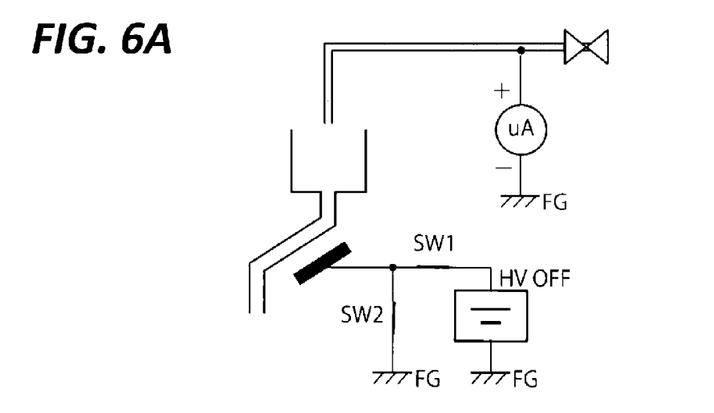
FIG. 6A is a schematic view illustrating the procedure for measuring the deterioration degree.

FIG. 6A illustrates the state at a time point t0, that is, the initial state. The high voltage DC power source 132 (HV) is in OFF state, and the first switch 138 (SW1) and the second switch 144 (SW2) are in the closed state. The potential of the electrode 160 is 0 V (step 1).

Next, at a time point t1, the second switch 144 becomes the opened state while the first switch 138 is kept in the closed state (step 2).

Figure 6B:
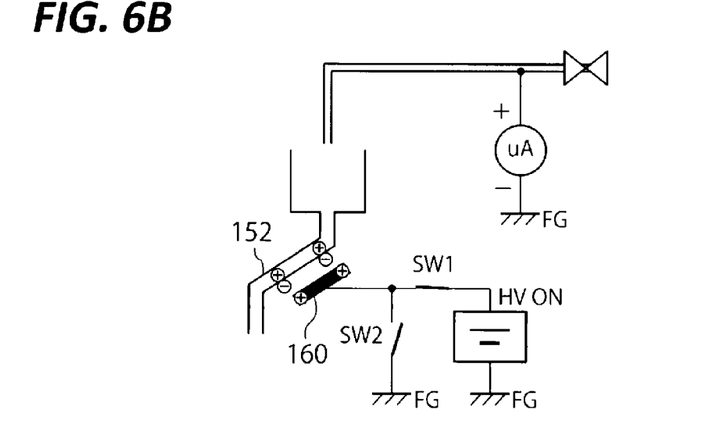
FIG. 6B is a schematic view illustrating the procedure for measuring the deterioration degree.

Next, at a time point t2, the high voltage DC power source 132 becomes ON state, and a predetermined voltage is applied to the electrode 160 to positively charge the electrode 160 (step 3). The state at this time is illustrated in FIG. 6B. That is, dielectric polarization occurs in the liquid receiver (drainage pipe 152 in the illustrated example) due to the electric field formed by the positively charged electrode 160, and a liquid contact surface (surface that is brought into contact with the liquid ejected from the nozzle 100) of the drainage pipe 152 is positively charged. At this time, it may be confirmed by the electrometer 148 that the electrode 160 is at the intended potential. Alternatively, it may be confirmed by a voltage monitor of the high voltage DC power source 132 that the electrode 160 is at the intended potential.

The voltage detected by the electrometer 148 is sent to the controller 180, and the controller 180 executes the next step when the detected voltage reaches a target value. When the detected voltage does not reach the target value after the lapse of a predetermined time, the controller 180 determines that an abnormality (e.g., electric leakage or failure of the high voltage DC power source 132) occurs in the voltage application unit 130, and generate an alarm via a user interface (e.g., display (not illustrated)).

The first switch 138 and the second switch 144 have contact life, and thus, it is desirable that the number of times of opening/closing of these switches is counted by the controller 180 or a host controller. When the number of counts reaches a predetermined number, replacement of the switches 138 and 144 may be prompted to an operator using the user interface.

At a time point t3 after the detected voltage reaches the target value, the first switch 138 is opened and the electrode 160 is in the floated state while being kept charged (step 4). At this time as well, the monitoring of the potential of the electrode 160 by the electrometer 148 is continued.

Figure 6C:
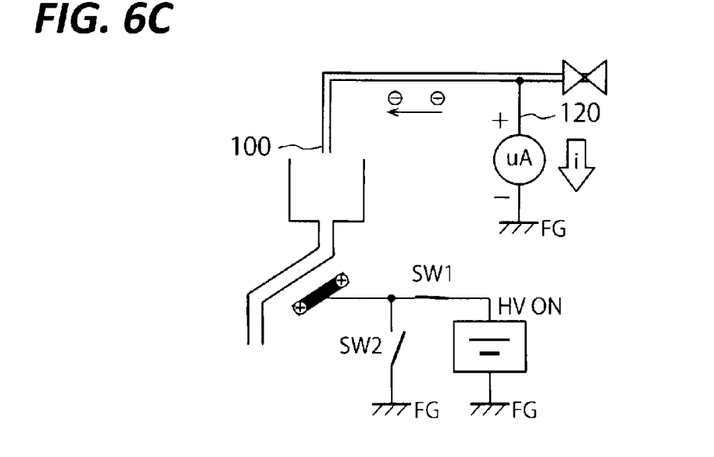
FIG. 6C is a schematic view illustrating the procedure for measuring the deterioration degree.

After confirming that the potential of the electrode 160 is still at the target value, at a time point t4, the opening/closing valve 118 is opened, and the measurement liquid is ejected to the dummy dispense port 150 via the conductive pipe 102 and the nozzle 100. At this time, the measurement liquid is ejected such that a liquid column that continuously extends from the ejection port of the nozzle 100 to a liquid landing point of the measurement liquid on the dummy dispense port 150. That is, the measurement liquid should not be ejected so as to form a plurality of intermittent droplets.

By ejecting the measurement liquid from the nozzle 100 as described above, a path (hereinafter, also referred to as a "charge moving path") including the following sections through which electrons may move is established.

A first section from the frame ground FG through the ground line 120 to the connecting point of the ground line 120 to the conductive pipe 102 (specifically, connecting point of the ground line 120 with respect to the outer portion 102C of the conductive pipe 102)

A second section from a contact interface between the measurement liquid flowing inside the conductive pipe 102 and the inner portion 102D of the conductive strip 102B through the flowing measurement liquid to the dummy dispense port 150 or the portion of the measurement liquid in the drainage pipe 152 flowing in the vicinity of the electrode 160 (the second section is electrically connected with respect to the first section via the conductive strip 102B)

At the moment when the charge moving path described above is established (this moment is also the moment when the measurement liquid first passes through the vicinity of the electrode 160), electrons are moved to the measurement liquid present in the vicinity of the electrode 160 from the frame ground FG due to electrostatic induction. That is, a current instantaneously flows toward the frame ground FG through the ground line 120. This current A is measured by the ammeter 124 (step 5). This state is illustrated in FIG. 6C.

The current A described above is a pulse-type current that flows in a very short time. In order to reliably detect such current, it is desirable that the ammeter 124 itself, or the controller 180 that receives the detected value of the ammeter 124 has a peak hold function. Hereinafter, the peak value of the current A is referred to as a peak current AP.

The current A (peak current AP) is changed depending on the potential of the electrode 160. As a result, it is also desirable to continuously monitor the potential of the electrode 160 by the electrometer 148 in a certain period before and after the time when the measurement liquid is ejected in step 5. The resistance may be measured more accurately by obtaining the relationship between the potential of the electrode 160 and the detected value of the ammeter 124 by an experiment in advance, and correcting the detected value of the ammeter 124 based on the relationship.

Figure 6D:
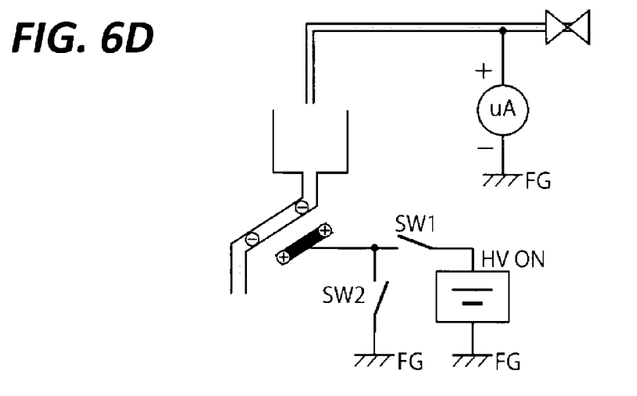
FIG. 6D is a schematic view illustrating the procedure for measuring the deterioration degree.

Thereafter, at a time point t5, the high voltage DC power source 132 is switched to OFF state (step 6). The state at this time is illustrated in FIG. 6D. At this time, the distribution of the charges in the vicinity of the electrode 160 is stabilized, and a current is not flowing through the ground line 120.

Figure 6E:
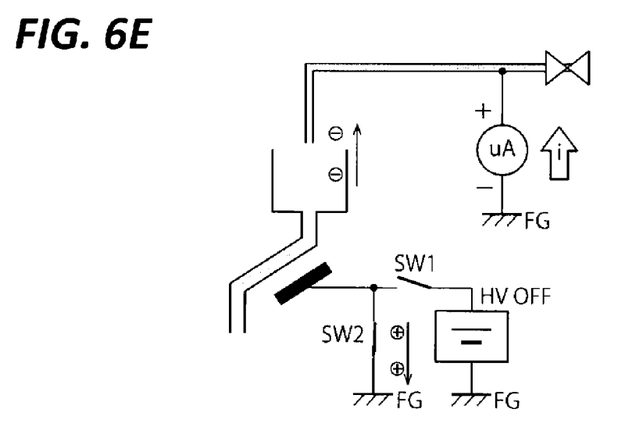
FIG. 6E is a schematic view illustrating the procedure for measuring the deterioration degree.

Next, at a time point t6, the second switch 144 becomes the closed state to electrically connect the electrode 160 and the frame ground while the measurement liquid is continuously ejected from the nozzle 100. Therefore, the potential of the electrode 160 is rapidly dropped to 0 V. Therefore, due to electrostatic induction, electrons are moved in the direction away from the electrode 160 through the charge moving path described above, and are moved to the frame ground through the ground line 120. That is, a current instantaneously flows from the frame ground FG through the ground line 120 to the conductive strip 102B. This current B is measured by the ammeter 124 (step 7). The state at this time is illustrated in FIG. 6E. The current B is also a pulse-type current that flows in a very short time. Hereinafter, the peak value of the current B is referred to as a peak current BP.

Since the resistor 146 is provided on the ground line 142, a surge current that may be flow into the ammeter 124 at the moment when the second switch 144 is in the closed state may be minimized, and thus, the measurement accuracy of the ammeter 124 may be improved. Further, other electronic devices connected to the frame ground may be protected from the surge current. The resistance value of the resistor 146 may be, for example, about several tens of M.

Figure 6F:
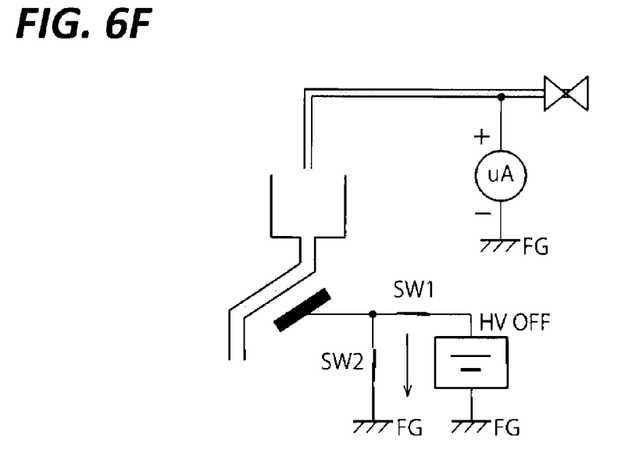
FIG. 6F is a schematic view illustrating the procedure for measuring the deterioration degree.

Next, at a time point t7, the first switch 138 becomes ON state while the measurement liquid is continuously ejected from the nozzle 100 (step 8). The state at this time is illustrated in FIG. 6F. Therefore, the charge on the dummy dispense port 150 may be minimized. This contributes to the improvement of measurement accuracy in the next measurement cycle.

Next, at a time point t8, the opening/closing valve 118 is closed to stop the ejection of the measurement liquid from the nozzle 100 (step 9). One measurement cycle is completed.

The measurement cycle of step 1 to step 9 described above is repeated a plurality of times.

The controller 180 calculates the sum (|AP|+|BP|) of the absolute value of the peak value AP and the absolute value of the peak value BP in each measurement cycle, and obtains the average value of the sum (|AP|+|BP|) in all cycles. Based on the average value, the deterioration degree of the conductive strip 102B of the conductive pipe 102 may be obtained.

The allowable limit value of the average value may be found by performing the above measurement on the conductive pipe 102 in which approximately allowable limit deterioration occurs. Therefore, the necessity of replacing the conductive pipe 102 may be determined based on the comparison between the average value and the allowable limit value.

Instead of the average value of the measured values of a plurality of cycles, the deterioration degree of the conductive strip 102B may be determined by the measured value of one cycle.

The value obtained by dividing the voltage applied to the electrode 160 by the detected current value (e.g., sum (|AP|+|BP|)) described above) of the ammeter 124 is considered as a resistance value (apparent resistance value), and the deterioration degree of the conductive strip 102B may be determined based on the resistance value. However, if the voltage applied to the electrode 160 may be maintained constant, the deterioration degree of the conductive strip 102B may be determined only based on the detected current value of the ammeter 124, and thus, the detected current value of the ammeter 124 itself may be used as a criterion for determining the deterioration degree of the conductive strop 102B.

Next, setting of the resistance value of the resistor 122 provided on the ground line 120 will be described. The conductive strip 102B and the resistor 122 are connected with each other in series in the above charge moving path. As a result, when the resistance value of the resistor 122 is greatly larger than the resistance value of the conductive strip 102B, the current value measured by the ammeter 124 hardly changes even when the resistance value of the conductive strip 102B, which is an index of the deterioration degree of the conductive strip 102B, is fluctuated to some extent. Since the amount of change in the resistance value of the conductive strip 102B due to the deterioration of the conductive strip 102B is approximately 400 MΩ (this value is an example), it should be avoided setting the resistance value of the resistor 122 significantly higher than 400 MΩ.

Meanwhile, other problems may occur when the resistance value of the resistor 122 is too low (including a case where the resistor 122 does not exist). Descriptions will be made in this regard with reference to a graph in FIG. 7A. In the graph in FIG. 7A, the horizontal axis indicates a resistance value R from the surface of the inner portion 102D of the conductive strip 102B to the connecting point of the ground line 120 with respect to the frame ground, and the vertical axis indicates a current value I measured by the ammeter 124 in step 5.

According to Ohm's law, the current value measured by the ammeter 124 is inversely proportional to the sum of the resistance value of the resistance value of the resistor 122 and the resistance value of the conductive strip 102B (specifically, the resistance value between the inner portion 102D and the outer portion 102C). As a result, when the resistor 122 does not exist or the resistor 122 is too low (e.g., region P in FIG. 7A), the measured value of the ammeter 124 is too largely changed by a slight change in the resistance value of the conductive strip 102B. In this case, the measured value of the ammeter 124 is largely changed by a slight change in measurement conditions (e.g., a change in an ionization degree of the measurement liquid), and eventually, the obtained resistance data becomes unstable.

Figure 7A:
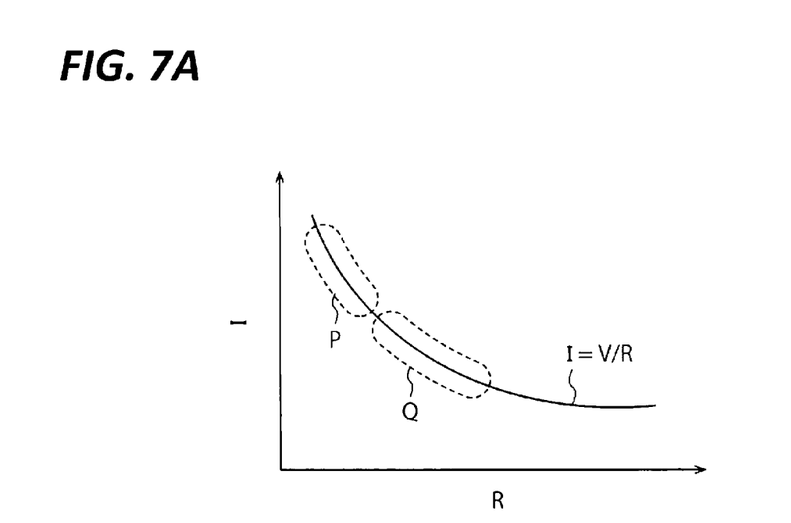
FIG. 7A is a graph for explaining a measurement condition of the deterioration degree.

It is desirable to determine the resistance value of the resistor 122 such that the measured value of the ammeter 124 is stably changed with respect to the change in the resistance value of the conductive strip 102B, and further, the change of the measured value of the ammeter 124 with respect to the change in the resistance value of the conductive strip 102B is sufficiently large (however, not too large) (e.g., region Q in FIG. 7A). When the amount of the change in the resistance value of the conductive strip 102B due to the deterioration of the conductive strip 102B is approximately 400 MS1 as described above, the resistance value of the resistor 122 may be about 100 MS1 (this value is an example).

Figure 7B:
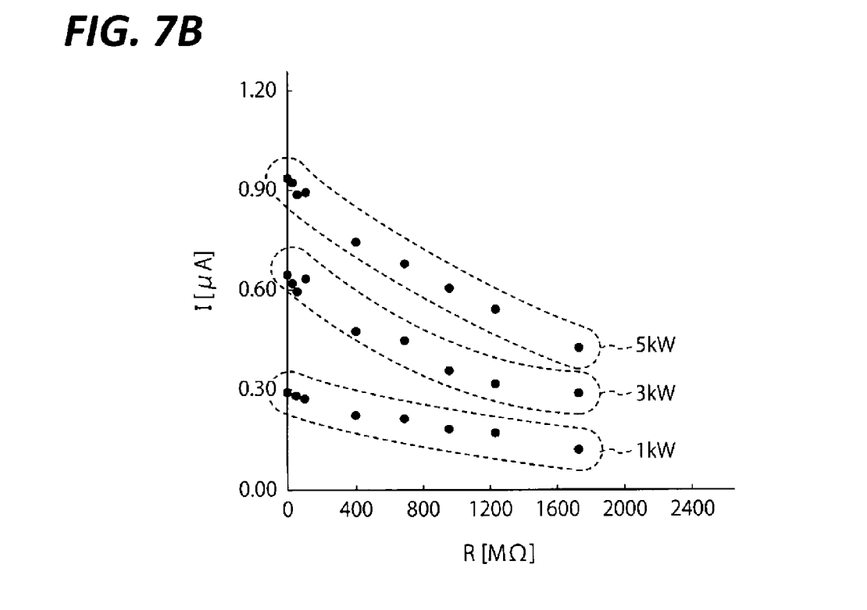
FIG. 7B is a graph for explaining a measurement condition of the deterioration degree.

FIG. 7B illustrates a graph illustrating experimental results obtained by measuring the relationship between the resistance value of the resistor 122 and the measured value of the ammeter 124 for every voltage applied to the electrode 160 when the conductive pipe 102 that is not damaged is used, DIW is used as the measurement liquid, and the variable resistor is used as the resistor 122. The resistance value of the variable resistor may be considered to be substantially equivalent to the sum of the resistance values of the conductive strip 102B and the resistor 122 connected in series. That is, the resistance (damage) change of the conductive strip 102B may be simulated by changing the resistance value of the variable resistor. It may be seen that the higher the voltage applied to the electrode 160, the greater the slope of the resistance value-current value diagram. This means that the change in damage to the conductive strip 102B may be detected more sensitively.

Figure 7C:
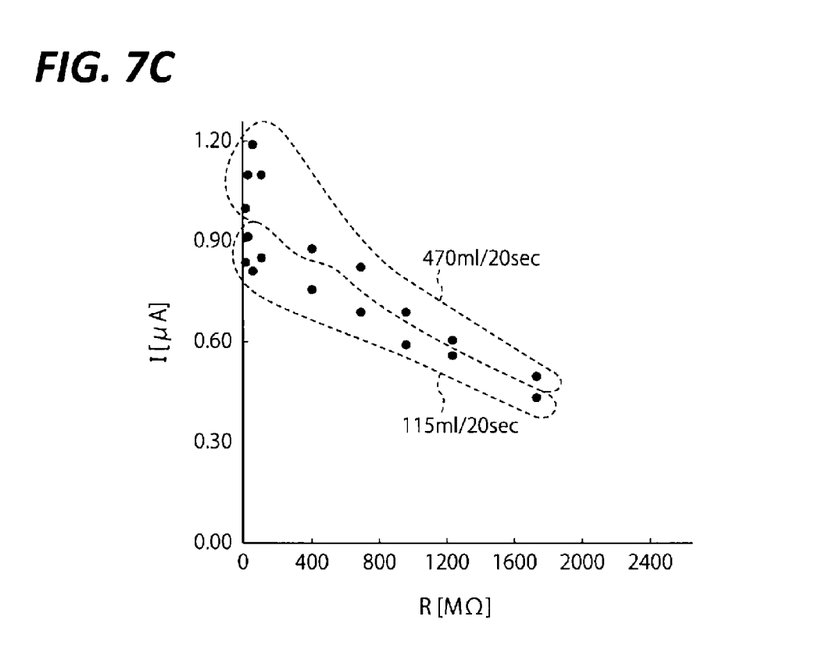
FIG. 7C is a graph for explaining a measurement condition of the deterioration degree.

FIG. 7C illustrates a graph illustrating experimental results obtained by measuring the relationship between the resistance value of the resistor 122 and the measured value of the ammeter 124 for every flow rate of the DIW ejected toward the dummy dispense port 150 from the nozzle 100 using the same experiment equipment as the experiment described in FIG. 7B. It may be seen that, in a case where the flow rate of the DIW is large, the slope of the resistance value-current value is great, and thus, the damage of the conductive strip 102B may be detected more sensitively. It is considered that, in the case where the flow rate of the DIW is large, the surface area of the measurement liquid (DIW) that exists in the dummy dispense port 150 and the drainage pipe 152 is large, and thus the induced current becomes large. This means that the flow rate of the measurement liquid needs to be maintained at the same value for each measurement.

Figure 8:
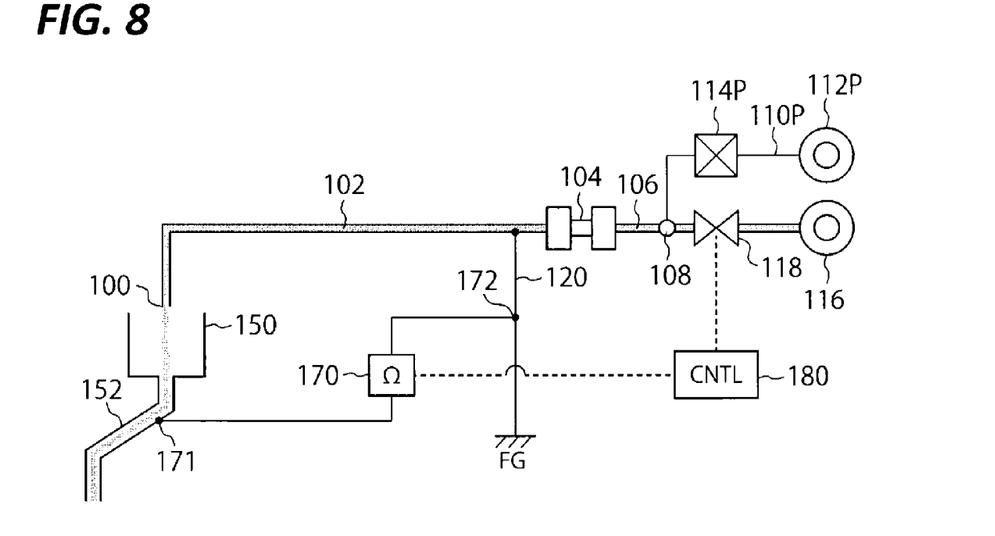
FIG. 8 is a schematic view illustrating a configuration of a second embodiment of the deterioration degree measuring unit included in the processing unit.

FIG. 8 illustrates a second embodiment of the deterioration degree measuring unit. In the second embodiment, the dummy dispense port 150 and the drainage pipe 152 (specifically, at least a portion to which a first terminal 171 (to be described later) is connected) is made of a conductive material. The deterioration degree measuring unit includes a resistance meter 170, and the first terminal 171 of the resistance meter 170 is electrically connected to the drainage pipe 152, and a second terminal 172 thereof is electrically connected to the ground line 120. The second terminal 172 may be connected to the outer portion 102C of the strip 102B of the conductive pipe 102.

In the second embodiment, while continuously ejecting the measurement liquid from the nozzle 100, resistance between the first terminal 171 and the second terminal may be measured by the resistance meter 170, and the deterioration degree of the conductive pipe 102 may be determined based on the resistance value.

As is well known, the resistance meter includes a voltage application unit that applies a voltage to the resistance measurement section, and a current measuring unit (ammeter) that measures the current flowing through the resistance measurement section, and is a device that measures the resistance in the resistance measurement section based on the relationship between the voltage and the current.

Since the deterioration degree measuring unit of the second embodiment has a simple configuration, one resistance meter 170 may be commonly used for measuring the deterioration degree of a plurality of conductive pipes 102. In this case, terminals capable of reliably and stably electrically connecting the first terminal 171 and the second terminal of the resistance meter 170 may be provided in the dummy dispense port 150 (or drainage pipe 152) and the ground line 120.

According to the embodiment, the deterioration of the conductivity of the conductive pipe may be easily and accurately detected. As a result, it is possible to replace the conductive pipe at timing when replacement is required. As a result, it is possible to prevent unnecessary costs from occurring by replacing the conductive pipe, which is relatively expensive, earlier than necessary. Further, it is possible to prevent the occurrence of problems that may occur due to the use of a deteriorated conductive pipe.

The method described above may be similarly applied even in a case where the nozzle 100 is a member attached to the tip end of the conductive pipe 102 separate from the conductive pipe 102.

According to the present disclosure, the deterioration of the conductivity of the conductive pipe may be easily and accurately detected.

From the foregoing, it will be appreciated that various embodiments of the present disclosure have been described herein for purposes of illustration, and that various Modifications may be made without departing from the scope and spirit of the present disclosure. Accordingly, the various embodiments disclosed herein are not intended to be limiting, with the true scope and spirit being indicated by the following claims.

What is claimed is:

1. A substrate processing apparatus comprising:
   a substrate holder configured to hold and process a substrate;
   a nozzle configured to eject a processing liquid to the substrate held by the substrate holder;
   a conductive pipe connected to the nozzle and configured to supply the processing liquid to the nozzle;
   a ground line that connects the conductive pipe and a reference potential;
   a liquid receiver provided around the substrate holder and configured to receive the processing liquid ejected from the nozzle; and
   a deterioration degree measuring unit configured to measure a deterioration degree of conductivity of the conductive pipe,
   wherein the deterioration degree measuring unit includes:
      a measurement liquid supply configured to supply a measurement liquid to the conductive pipe and eject the measurement liquid from the nozzle;
      a potential difference generator configured to impart a potential difference between a liquid contact surface of the liquid receiver and the reference potential; and
      an ammeter configured to, when the measurement liquid is ejected from the nozzle to the liquid receiver, measure a current value of a current flowing through a charge moving path established via the measurement liquid between the liquid contact surface of the liquid receiver and the ground line.

2. The substrate processing apparatus according to claim 1, wherein the liquid receiver includes a conductive material,
   a resistance meter is configured by a DC power source serving as the potential difference generator and the ammeter, and
   a first terminal of the resistance meter is electrically connected to the ground line, and a second terminal of the resistance meter is connected to the liquid receiver containing the conductive material.

3. The substrate processing apparatus according to claim 1, wherein the nozzle includes a tip end portion of the conductive pipe, or includes a member different from the conductive pipe and mounted on the conductive pipe.

4. The substrate processing apparatus according to claim 1, wherein the liquid receiver includes a dielectric material,
   the potential difference generator includes:
      an electrode provided close to the liquid receiver; and
      a voltage source configured to apply voltage to the electrode,
   the ammeter is provided on the ground line, and
   when the measurement liquid ejected from the nozzle to the liquid receiver passes through the liquid receiver, an induced current flowing through the ground line is measured by the ammeter.

5. The substrate processing apparatus according to claim 4, wherein a resistor is provided on the ground line.

6. The substrate processing apparatus according to claim 4, further comprising:
   an electrometer configured to measure a potential of the electrode.

7. The substrate processing apparatus according to claim 4, wherein the potential difference generator further includes a switch configured to at least implement a state where the electrode is electrically connected to the voltage source but is not electrically connected to the reference potential, and a state where the electrode is not electrically connected to the voltage source but is electrically connected to the reference potential.

8. The substrate processing apparatus according to claim 7, wherein the switch includes:
   a first conductive line that connects the voltage source and the electrode;
   a first switch provided on the first conductive line;
   a second conductive line that connects the electrode and the reference potential; and
   a second switch provided on the second conductive line.

9. The substrate processing apparatus according to claim 8, wherein the first switch and the second switch are B-contact type switches.

10. The substrate processing apparatus according to claim 8, wherein a resistor is provided on the second conductive line.

11. A method for determining a deterioration degree of conductivity of a conductive pipe in a substrate processing apparatus including:
   a substrate holder configured to hold and process a substrate;
   a nozzle configured to eject a processing liquid to the substrate held by the substrate holder;
   the conductive pipe connected to the nozzle and configured to supply the processing liquid to the nozzle;
   a ground line that connects the conductive pipe and a reference potential; and
   a liquid receiver provided around the substrate holder and configured to receive the processing liquid ejected from the nozzle,
the method comprising:
   imparting a potential difference between a liquid contact surface of the liquid receiver and the reference potential;
   supplying a measurement liquid to the conductive pipe thereby ejecting the measurement liquid from the nozzle to the liquid receiver; and
   when the measurement liquid is ejected from the nozzle to the liquid receiver, measuring a current value of a current flowing through a charge moving path established via the measurement liquid between the liquid contact surface of the liquid receiver and the ground line.

* * * * *